United States Patent [19]

Oten

[11] Patent Number: 4,600,229
[45] Date of Patent: Jul. 15, 1986

[54] VACUUM CUP

[76] Inventor: Peter D. Oten, 1731 Harrow Ct. - No. B, Wheaton, Ill. 60187

[21] Appl. No.: 637,310

[22] Filed: Aug. 3, 1984

[51] Int. Cl.⁴ .............................................. B66C 1/02
[52] U.S. Cl. ................................................. 294/64.1
[58] Field of Search ................... 294/66.1, 64.2, 64.3, 294/65; 414/627, 737, 744 B, 752; 248/205.5, 206.2, 206.3, 206.4, 309.3, 362; 269/21; 271/106

[56]  References Cited
U.S. PATENT DOCUMENTS 3,154,306 10/1964 Elliott et al. ......................... 294/64.1
3,330,589 7/1967 Mumma .............................. 294/64.1
3,656,794 4/1972 McCord ............................. 294/64.1

Primary Examiner—James B. Marbert
Attorney, Agent, or Firm—Edmond T. Patnaude

[57] ABSTRACT

A bellows type vacuum cup including an annular volume over the bellows when completely collapsed exposing the entire inner surface of the cup to a vacuum source providing for increased workpiece holding force. Means for stabilizing the bellows against radial collapse is provided as well as means for reducing slipping of the cup on the workpiece surface.

7 Claims, 6 Drawing Figures

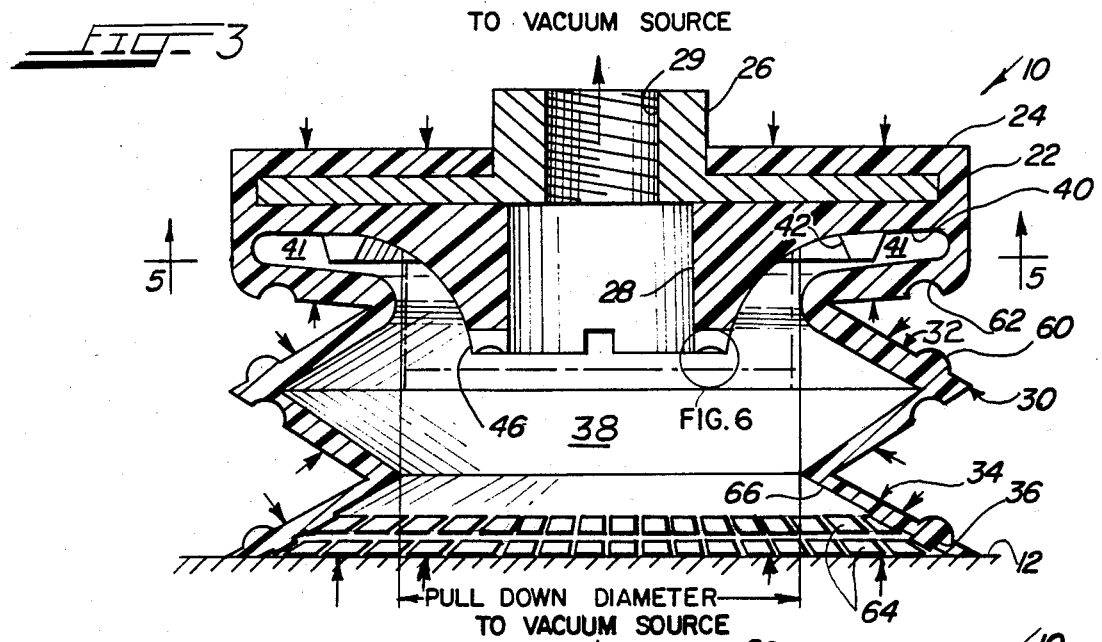
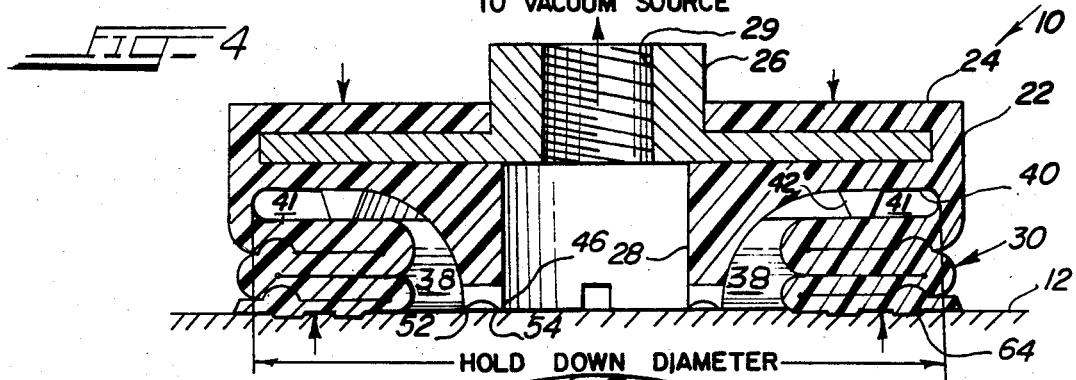
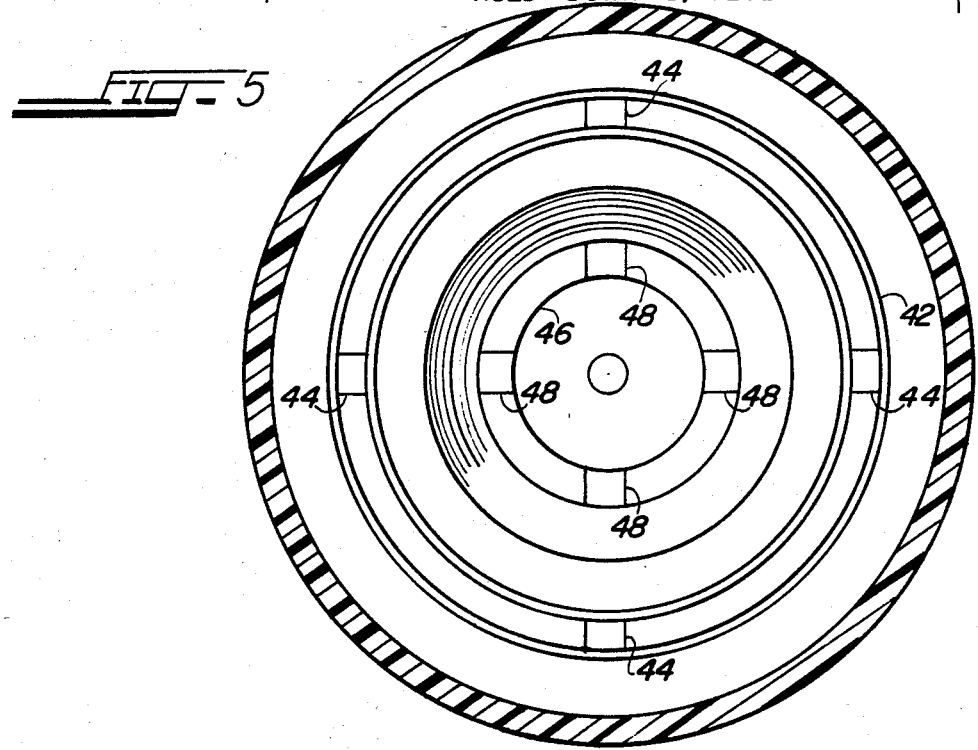

VACUUM CUP

BACKGROUND OF THE INVENTION

This invention relates to vacuum cups and more particularly to vacuum cups of the type having a convoluted bellows. More particularly, the invention relates to vacuum cups of the type known generally as external vacuum operated cups.

Vacuum cups are typically used in material handling operations and are particularly adapted for attachment to flat panels or relatively flat workpieces to transfer the panel or workpiece between locations. For example, to transfer a piece from one location to another, one or more vacuum cups are vacuum attached to the workpiece. The workpiece is lifted and moved to the desired location whereat, upon discontinuance of the vacuum, the workpiece is released. The holding force of these vacuum cups depends upon the effective surface area of the cup upon which ambient air pressure can act. Greater effective surface area provides for a proportional increase in the holding force developed by the cup. Heretofore, to maximize the holding force, the cups have been made as large as possible for a particular workpiece configuration, so as to maximize the effective surface area. Also, the vacuum level drawn on the cup has been maximized to effect an increased holding force. Additionally, because the holding force available from present vacuum cups has not been as great as desired, the total number of vacuum cups required to lift a particular workpiece has been greater than desired.

It is common for metallic workpieces to be coated with a thin film of oil to protect against corrosion. The oil film acts as a lubricant which contributes to slipping of the workpiece relative to the vacuum cup. Marginal holding forces and the tendency of oiled pieces to slip reduces the speeds at which the piece can be safely transferred. It would therefore be desireable to provide means for reducing such slipping.

Also, bellows type vacuum cups typically include a convoluted wall which forms the bellows. It is desirable that the convoluted wall be thin and flexible, particularly at the interface with the workpiece, so as to provide for conformity of the bellows free end to the configuration and any irregularities in the surface of the workpiece. However, the thin, flexible nature of the bellows is susceptible to being pulled radially into the cup interior under the influence of the vacuum behind the bellows which can break the vacuum seal. This shortcoming is accentuated by the use of greater vacuums and the lubricating effect of an oil on the workpiece.

It can be appreciated that it would be desirable to provide for a vacuum cup having increased holding force over present vacuum cups without increasing the overall size of the cup or level of vacuum. It would also be desirable to reduce the number of vacuum cups required to lift a particular workpiece. Further, it can be appreciated that it would be highly desirable to provide for a vacuum cup that adheres to oiled and irregular shaped surfaces.

SUMMARY OF THE INVENTION

In accordance with the preferred embodiment of the invention, a vacuum cup is provided with an annular volume extending from the main cavity of the cup over the bellows when in the collapsed operative state. The annular volume provides increased effective surface area in the collapsed state over which ambient air pressure acts without increasing the overall size of the cup. The increased effective surface area provides for an increase in the available hold down force developed by a particular size cup for a given level of vacuum drawn on the cup interior.

In accordance with another feature of the invention, adjacent external surfaces of the bellows convolutes are provided with complementary ridges and grooves which interlock when the bellows is in the collapsed operative state providing for radial stability of the convolutes and the bellows wall.

Another important feature of the invention provides for lateral stability of the lowermost convolute at the interface with the workpiece. Anti-slip ridges are included on the inner surface of the lowermost convolute which engage the workpiece when the convolutes are in the collapsed operative state.

A still further important feature of the invention provides a novel stop member which engages the workpiece in the operative state with the convolutes interlocked. The workpiece stop member also includes anti-slip means for reducing slipping of the cup along the workpiece.

BRIEF DESCRIPTION OF THE DRAWINGS

The present invention will be better understood after reading the following detailed description in connection with the accompanying drawings wherein:

FIG. 3 is a vertical cross-sectional view of a vacuum cup embodying the present invention in an extended position showing details of construction and the forces acting on the cup during pull down;

FIG. 4 is a vertical cross-sectional view of the cup of FIG. 3 in an operative state showing details and operation of the cup embodying the present invention during attachment and hold down to a workpiece;

FIG. 5 is a horizontal cross-sectional view taken along the line 5—5 of FIG. 3 showing further details of construction of the vacuum cup embodying the present invention.

DETAILED DESCRIPTION OF THE PREFERRED EMBODIMENT

Figure 1:
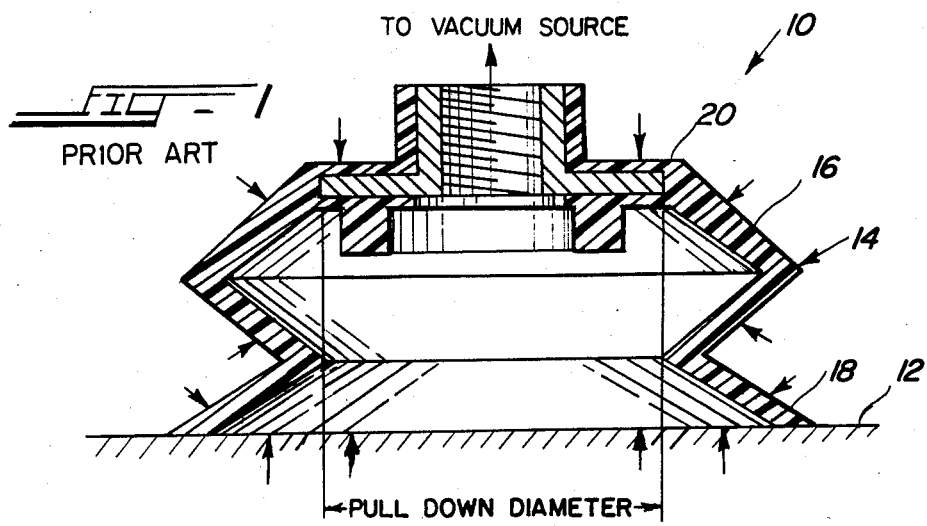
FIG. 1 is a vertical cross-sectional view of a prior art vacuum cup in an extended position showing details of typical construction and the forces acting on a vacuum cup during pull down to a workpiece.
Figure 2:
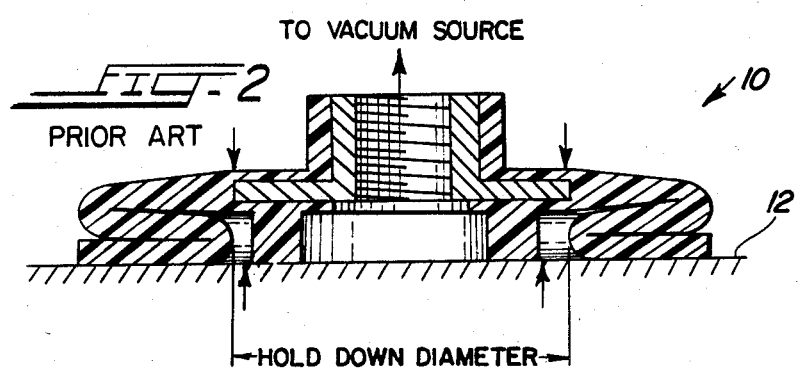
FIG. 2 is a vertical cross-sectional view of the prior art vacuum of FIG. 1 in an operative state showing details and operation of the cup during attachment and hold down to a workpiece.

Shown in FIGS. 1 and 2 is a typical prior art vacuum operated bellows type cup 10 shown in an extended inoperative position and collapsed operative position respectively. FIG. 1 shows the force system acting on the prior art cup during pull down of the cup to a workpiece surface 12, and FIG. 2 shows the force system acting on the prior art cup for holding the cup to the workpiece. The prior art cup includes a convoluted bellows 14 made up of a series of convolute portions, such as 16, 18, depending from the periphery of an upper body member 20. As shown in FIG. 1, the force available for pushing the upper body member down to collapse the bellows and engage the workpiece is equal to the difference between the magnitude of the ambient air pressure and the vacuum drawn on the cup interior, times the effective surface area on the cup over which the air pressure acts.

With the bellows extended as shown in FIG. 1, air pressure acts on the exposed external surface of each convolute portion such that the net downward force on the upper body member immediately over the bellows is zero. Therefore, the available surface area of the cup upper member over which the air pressure can effectively act to create a pull down force is limited to an area equal to the area of the upper member inner surface falling within the inner diameter of the convolutes, which is designated in FIG. 1 as the pull down diameter.

Referring to FIG. 2, it can be seen that the available surface over which the air pressure can effectively act when the bellows has been completely collapsed is again equal to the area of the inner surface of the upper member falling within the inner diameter of the convoluted bellows, designated as the hold down diameter in FIG. 2. In other words, in the prior art cup, because the effective surface area over which air pressure acts is the same with the bellows extended as when collapsed, the force developed for pulling the cup down to the workpiece is equal to the force developed for holding the cup to the workpiece.

The vacuum cup of the present invention is best shown in FIGS. 3 and 4. The vacuum cup 10 is preferably a one piece molded elastomeric member and includes an upper portion 22 which preferably has a planar outer surface 24. A rigid mounting plate 26 is molded within or otherwise attached to the upper portion 22 and acts to stiffen the upper portion. The plate 26 also acts as a mount for an external vacuum source attachment, not shown. The upper portion 22 includes a central aperture 28 and the mounting plate 26 is provided with a threaded hole 29 coaxial with the aperture 28. Typically, a rigid pipe is threaded into the hole 29 and provides for both lifting and movement of the cup, as well as a flow passage connecting the cup interior to the external vacuum source.

A convoluted bellows 30 depends from the periphery of the upper body portion 22, and in the embodiment shown, is comprised of a plurality of generally V-shaped in cross section convolute portions, two of which are shown and designated in the FIGS. 3 and 4 by the numerals 32, 34. The number of convolutes and the length of the bellows formed are not critical, and those skilled in the art can readily design a cup with any preferred number of convolute portions. The convolute portions are serially attached end-to-end and preferably are of a one piece molded construction. A free end 36 of the lowermost convolute portion 34 engages the workpiece to form a vacuum seal. With the bellows engaged to the workpiece, a vacuum cavity 38 is formed.

As shown in FIG. 3, the uppermost convolute portion 32 depends from the periphery of the upper portion 22 and extends inwardly toward the cavity interior across a portion of the inner surface 40 of the cup upper portion. According to an important aspect of the present invention, the upper convolute portion 32 is maintained spaced from the inner surface 40 when completely collapsed forming a volume defining an annular extension 41 of the vacuum cavity 38 over the bellows. Referring to FIG. 4, in which the bellows is shown in the completely collapsed operative state, the upper convolute is maintained spaced from the inner surface of the upper portion. The convolute stop member 42 is dimensioned such that the upper convolute portion 32 contacts the convolute stop member 42 when all of the convolute portions are completely collapsed together in intimate side by side relationship. With the convolutes completely collapsed and abutting the convolute stop member 42, the annular cavity extension 41 is maintained, and the entirety of the inner surface 40 remains exposed to the vacuum source. As shown in FIG. 5, the convolute stop member 42 is a ring molded into and depending from the inner surface 40 of the upper member 22. The convolute stop member includes vacuum slots 44 which connect the vacuum cavity 38 to volume 41, thereby exposing the entirety of the inner surface to the vacuum source when the bellows is completely collapsed. Other stop member configurations can be readily devised, and the invention is not to be considered limited to that shown herein.

The upper portion 22 also includes a workpiece stop 46 shown in FIG. 5 as also being an annular ring depending from the inner surface 40. The workpiece stop 46 is provided with transverse slots 48 similar to the vacuum slots 44, which connect the cavity 38 to the vacuum source when the workpiece stop is engaged against the workpiece. The workpiece stop 46 is dimensioned such that it engages the workpiece when the convolute portions are completely collapsed as shown in FIG. 4. It can be seen that with the workpiece stop 46 against the workpiece, the convoluted bellows is in a completely collapsed state against the convolute stop member 42 forming a solid cup wall and exposing substantially the entire inner surface area of the cup upper member 22 to the vacuum source.

Figure 6:
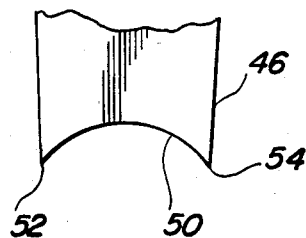
FIG. 6 is an enlarged cross-sectional view of a cut away portion of the workpiece stop showing details of construction.

As best shown in the enlarged cross section of a portion of the workpiece stop in FIG. 6, the workpiece stop 46 is provided with a slight concave surface 50. The concave surface provides for annular ridges 52, 54 that function as cup anti-slip members. When engaged against oiled surfaces, the relatively sharp ridges break through the oil film much easier than a flat surface and engage the surface of the workpiece, thereby minimizing slipping of the cup reliable to the workpiece surface.

Another important aspect of the invention is also shown in FIGS. 3 and 4. The outer adjacent surfaces of each convolute portion are provided with a semi-circular shaped annular raised portion 60 and a complementary annular recess 62 for receiving the raised portion. As shown in FIG. 4, the raised portion 60 is received in the recess 62 when the bellows is completely collapsed and interlocks the convolute portions together. The interlocking feature is provided to prevent relative movement between adjacent convolutes and to add radial stability to the bellows. It can be seen that the bellows thereby has increased resistance to radial collapse into the cavity 38 during operation.

It is desirable from an operational standpoint that the free end 36 of the bellows be flexible so that it will conform to workpiece surface irregularities and shapes. Typically, the free end of the bellows is made thinner in cross section than the upper portion of the bellows to provide for greater flexibility. However, the thin, flexible free end has a greater tendency to move laterally relative to the workpiece when vacuum is drawn behind it causing the free end 36 and the lowermost convolute 34 to be pulled radially into the cavity resulting in loss of the vacuum seal. The present invention includes a bellows anti-slip member 64 on the inner surface 66 of the lowermost convolute portion 34 adjacent the free end 36. The preferred bellows anti-slip member is a generally waffle pattern grid of raised members molded onto the inner surface 66 of the lowermost convolute. The waffle patterned, raised members engage the workpiece surface and reduce movement of the lower convolute relative to the workpiece surface. The height of raised members need not be great to effect anti-slipping characteristics, and it is preferred that their height be minimized so as not to interfere with the engagement of the free end with the workpiece surface. It is contemplated that raised members having a height on the order of 0.001 "to 0.010" will be satisfactory. The invention is to be considered to include other bellows anti-slip members that can be readily devised after reading this disclosure.

As shown in FIG. 3, the bellows is made with increasing thickness from the free end toward the attachment at the upper portion of the cup. As mentioned, the thinner free end provides for increased flexibility for conforming to surface irregularities and shapes other than flat workpieces, and the thicker upper end provides for stiffening of the bellows so as to limit collapse of the uppermost convolute portion against the inner surface of the upper portion 22. It is possible by adjusting the durometer of the elastomeric material and the thickness of the upper convolute to limit the movement of the upper convolute so as to maintain the spaced relationship with the inner surface 40 without the use of the convolute stop 42.

OPERATION

In operation, the vacuum cup is placed on the workpiece to be lifted and vacuum is drawn on the cavity, for example, by an external source. Referring to FIG. 3, it can be seen that the force system acting on the cup with the bellows extended is the same as that acting on the prior cup. The ambient air pressure acting on the bellows external surfaces removes that area of the upper member immediately over the bellows from which ambient air pressure can effectively act. The result being that the effective surface area over which air pressure acts on the outer surface of the upper member is limited to that area equal to the area of the inner surface defined by the inner diameter of the convolutes, designated as the pull down diameter in FIG. 3. As vacuum is drawn on the cavity, ambient air pressure acting over the pull down area creates a force equal to the effective pull down area times the difference between the air pressure and vacuum level which pushes the upper member down collapsing the bellows. Referring to FIG. 4, movement of the cup continues until the workpiece stop contacts the workpiece. At this position the bellows is completely collapsed with the convolute grooves and recesses engaged interlocking the convolute portions together. The upper convolute is engaged against the convolute stop member. In this position, because the convolutes are closed, ambient air pressure is prevented from acting on the convolute external surfaces other than in a direction tending to collapse the bellows radially. This tendency to collapse the bellows radially is resisted by the interlocked grooves and recesses. At the same time, because the surface area of the upper member inner surface immediately over the width of the convolutes is exposed to vacuum, and because the closed bellows eliminates upwardly directed forces under the bellows, the effective surface area over which ambient air pressure acts on the outer surface is increased by an amount equal to the area of the convolute. The effective surface area available for developing a force for holding the cup to the workpiece is therefore essentially equal to the entire inner surface area of the upper portion of the cup minus the net contact area of the workpiece stop if present which is defined by the diameter of the upper member inner surface, designated as the hold down diameter in FIG. 4. It can be seen that the increased area results in a substantially greater force for holding the cup to the workpiece without increasing the overall diameter of the cup.

If the width of the convolutes is made greater, for example, to increase their flexibility, or to provide greater contact surface with the workpiece, the pull down force will be proportionately reduced as in the case of the prior art cup. However, the more critical force needed for holding the cup to the workpiece will not change, because the effective surface area over which the air pressure can act with the convolutes collapsed remains unchanged. In the prior art cup, to maintain the same hold down force for wider convolutes, the overall diameter of the cup had to be made proportionately larger so as to maintain the same effective hold down surface area.

While the present invention has been described in connection with an externally operated vacuum cup, the invention is also applicable to mechanically operated bellows vacuum cups. These cups create a suction by mechanically collapsing the bellow to deflect a diaphragm which displaces a volume of air rather than evacuating the cavity by external means. These cups can benefit from my invention by incorporating the cavity extension over the bellows as disclosed to increase the effective surface area over which ambient air pressure can act when the bellows is in the completely collapsed operative state.

What is claimed is:

1. A vacuum cup for engaging a workpiece comprising:
    a substantially rigid first portion having an inner surface and an outer surface,
    a collapsible, resilient convoluted member attached at one end thereof to the periphery of said first portion defining a cavity on which a vacuum is drawn and having a free end for engaging said workpiece,
    said convoluted member comprising a plurality of adjacent convolutes attached together in end-to-end relationship,
    said adjacent convolutes being in intimate abutting side-by-side relationship when said convoluted member is completely collapsed, and
    lock means for preventing relative movement between said adjacent convolutes when in said intimate abutting side-by-side relationship.

2. The vacuum cup as defined in claim 1 wherein
    said lock means includes interlocking ridges and recesses respectively located on adjacent surfaces of each of said adjacent convolutes,
    said ridges are received in said recesses when said convoluted member is completely collapsed.

3. The vacuum cup as defined in claim 1 wherein
    said cup includes rigid plate means attached to said first portion for maintaining said first portion substantially rigid, and
    said rigid plate means and said first member include openings into said cavity.

4. The vacuum cup as defined by claim 1 wherein said convoluted member extends partially across and is maintained spaced from the inner surface of said first portion when said convoluted member is completely collapsed.

5. The vacuum cup as defined in claim 4 further comprising convolute stop means for maintaining said spacial separation of said convoluted member from said inner surface when said convoluted member is completely collapsed.

6. The vacuum cup as defined in claim 5 wherein said convolute stop means is a raised member on said inner surface dimensioned to engage said convoluted member when said convoluted member is completely collapsed.

7. A vacuum cup for engaging a workpiece comprising:
 a substantially rigid first portion having an inner surface and an outer surface,
 a collapsible, resilient convoluted member attached at one end thereof to the periphery of said first portion defining a cavity on which a vacuum is drawn and having a free end for engaging said workpiece,
 said convuluted member comprising a plurality of adjacent convolutes attached together in end-to-end relationship,
 said adjacent convolutes being in intimate abutting side-by-side relationship when said convoluted member is completely collapsed, and
 anti-slip means on an inner surface of the convolute adjacent said free end for maintaining lateral stability of said free end relative to said workpiece.

* * * * *